United States Patent
Higuchi et al.

(10) Patent No.: US 11,585,289 B2
(45) Date of Patent: Feb. 21, 2023

(54) THERMALLY SPRAYED COATING FOR SLIDING MEMBER AND SLIDING DEVICE PROVIDED WITH SAID THERMALLY SPRAYED COATING FOR SLIDING MEMBER

(71) Applicant: NISSAN MOTOR CO., LTD., Yokohama (JP)

(72) Inventors: Tsuyoshi Higuchi, Kanagawa (JP); Akinobu Itou, Kanagawa (JP); Hayato Hirayama, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/290,081

(22) PCT Filed: Nov. 2, 2018

(86) PCT No.: PCT/IB2018/001398
§ 371 (c)(1),
(2) Date: Apr. 29, 2021

(87) PCT Pub. No.: WO2020/089667
PCT Pub. Date: May 7, 2020

(65) Prior Publication Data
US 2021/0404413 A1 Dec. 30, 2021

(51) Int. Cl.
*F02F 3/10* (2006.01)
*C23C 4/131* (2016.01)
(Continued)

(52) U.S. Cl.
CPC .................. *F02F 3/10* (2013.01); *C23C 4/08* (2013.01); *C23C 4/131* (2016.01); *F02F 3/0084* (2013.01); *F16J 1/01* (2013.01)

(58) Field of Classification Search
CPC ... F02F 3/10; F02F 3/0084; F02F 1/00; C23C 4/08; C23C 4/131; C23C 4/02;
(Continued)

(56) References Cited

U.S. PATENT DOCUMENTS

| | | | | |
|---|---|---|---|---|
| 4,330,575 A | * | 5/1982 | Litchfield | C23C 4/06 427/217 |
| 2005/0227078 A1 | * | 10/2005 | Power | F04D 29/324 428/408 |

(Continued)

FOREIGN PATENT DOCUMENTS

| JP | 56-143329 A | 11/1981 |
|---|---|---|
| JP | 2007-308742 A | 11/2007 |

(Continued)

OTHER PUBLICATIONS

Wang Yongqiang et al., A Review on the Plastic Behavior and Improvement of Plasticity in High Strength Ultrafine-grained Metallic Materials, J.ISSN 1005 023X, 2018.

*Primary Examiner* — Kurt Philip Liethen
(74) *Attorney, Agent, or Firm* — Foley & Lardner LLP

(57) ABSTRACT

A sprayed coating for a sliding member of the present invention includes a ferrous alloy containing chromium (Cr).
The sprayed coating for the sliding member has the content rate of the chromium of 8 mass % or more, includes a structure that comprises crystal grains contained in the sprayed coating and having an average grain size of 3 μm or less, has a Vickers hardness of 300 Hv or more, and then is excellent at abrasion resistance.

14 Claims, 4 Drawing Sheets

(51) Int. Cl.
*C23C 4/08* (2016.01)
*F02F 3/00* (2006.01)
*F16J 1/01* (2006.01)

(58) Field of Classification Search
CPC ...... C23C 4/12; C23C 4/16; C23C 4/06; F16J 1/01; F04B 53/14; F04B 53/162
See application file for complete search history.

(56) References Cited

U.S. PATENT DOCUMENTS

| | | | | |
|---|---|---|---|---|
| 2006/0040125 A1* | 2/2006 | Obara | ............ | C23C 4/06 428/307.3 |
| 2007/0227299 A1* | 10/2007 | Marchiando | ...... | C04B 35/58071 75/244 |
| 2008/0213115 A1* | 9/2008 | Hilger | ............ | F04B 25/00 417/569 |
| 2011/0254230 A1* | 10/2011 | Jarosinski | ............ | C22C 32/0052 277/444 |
| 2012/0020828 A1* | 1/2012 | Suhonen | ............ | C23C 4/06 420/431 |
| 2013/0005618 A1* | 1/2013 | Barbezat | ............ | C23C 4/06 508/106 |
| 2013/0089682 A1* | 4/2013 | Izquierdo | ............ | C22C 38/52 427/580 |
| 2014/0225330 A1* | 8/2014 | Saito | ............ | C23C 4/129 277/442 |
| 2015/0118516 A1* | 4/2015 | Boileau | ............ | C23C 4/08 428/653 |
| 2015/0330507 A1* | 11/2015 | Kamura | ............ | C22C 30/00 427/451 |
| 2016/0002764 A1* | 1/2016 | Gries | ............ | B22F 1/145 427/446 |
| 2016/0139092 A1* | 5/2016 | Dumas | ............ | F04B 53/06 417/279 |
| 2016/0177863 A1* | 6/2016 | Hamada | ............ | C23C 4/067 123/193.2 |
| 2016/0230697 A1* | 8/2016 | Shinohara | ............ | C23C 4/06 |
| 2017/0218954 A1* | 8/2017 | Nishimura | ............ | F04C 18/3564 |
| 2017/0283933 A1* | 10/2017 | Ibe | ............ | C23C 4/12 |
| 2019/0093769 A1* | 3/2019 | Lima Sarabanda | ............ | F16J 9/26 |

FOREIGN PATENT DOCUMENTS

| | | |
|---|---|---|
| JP | 2012-41617 A | 3/2012 |
| JP | 2013-534965 A | 9/2013 |
| JP | 2013-237877 A | 11/2013 |
| JP | 2015-59544 A | 3/2015 |
| JP | 2018-9223 A | 1/2018 |

* cited by examiner

THERMALLY SPRAYED COATING FOR SLIDING MEMBER AND SLIDING DEVICE PROVIDED WITH SAID THERMALLY SPRAYED COATING FOR SLIDING MEMBER

TECHNICAL FIELD

The present invention relates to a thermal sprayed coating for a sliding member, and more specifically relates to a thermal sprayed coating for a sliding member, which contains an iron-based alloy containing chromium and has improved corrosion resistance.

BACKGROUND ART

Aluminum or aluminum alloy cylinder blocks for an internal combustion engine are provided with a cast iron liner on an inner circumferential surface of the cylinder bore, whereby functions, such as strength, wear resistance, and sliding characteristics, are improved.

However, the cast iron liner requires a thickness of a certain degree due to the production method of the cylinder block using the cast iron liner, and thus the weight of the entire cylinder block is increased. In addition, a gap is often generated on a surface joined to the cylinder block and thermal conductivity is often decreased.

In view of this, instead of using the cast iron liner, a thermal sprayed coating is formed on an inner circumferential surface of a cylinder bore, whereby weight of a cylinder block is reduced.

Patent Document 1 discloses a thermal spray wire to be used in thermal spraying on an inner surface of a cylinder bore.

A stainless steel-based thermal sprayed coating that contains chromium (Cr) is prevented from being corroded by low-quality fuel that contains a large amount of sulfur, but the thermal sprayed coating is reduced in peeling resistance due to lowering of bonding strength between thermal sprayed droplets that form the thermal sprayed coating. However, according to Patent Document 1, the decrease in bonding strength between thermal sprayed droplets can be prevented by adding a predetermined amount of manganese (Mn).

CITATION LIST

Patent Document

Patent Document 1: JP 2012-41617A

SUMMARY OF INVENTION

Technical Problem

However, the thermal sprayed coating disclosed in Patent Document 1 does not have sufficient strength, and the thermal sprayed coating easily partially comes off from the surface to generate abrasive particles. The generated abrasive particles act as polishing agent and further wear the thermal sprayed coating.

The present invention has been made in view of these problems in the prior art, and an object thereof is to provide an iron-based thermal sprayed coating for a sliding member, which has corrosion resistance and improved wear resistance.

Solution to Problem

The inventors of the present invention have made an intensive research to achieve the above object and have found the following findings. That is, performing fining crystal grains in a thermal sprayed coating in addition to increasing hardness of the thermal sprayed coating, enables achieving the above object. Thus, the present invention has been completed.

That is, a thermal sprayed coating for a sliding member of the present invention is composed of an iron-based alloy containing chromium (Cr).

The content of chromium is 8 mass % or more, the thermal sprayed coating includes a structure in which crystal grains have an average grain diameter of 3 μm or less and the thermal sprayed coating has Vickers hardness of 300 Hv or more.

Moreover, a sliding device of the present invention includes a sliding member and a mating member, and the sliding member and the mating member each have a coating on a base material and mutually slide.

The coating of the mating member is a hard carbon film, and the coating of the sliding member is the thermal sprayed coating for a sliding member.

Advantageous Effects of Invention

In the present invention, the thermal sprayed coating includes the structure in which crystal grains have an average grain diameter of 3 μm or less, and the thermal sprayed coating has Vickers hardness of 300 Hv or more. Thus, the present invention provides an iron-based thermal sprayed coating for a sliding member, which has improved wear resistance.

DESCRIPTION OF EMBODIMENTS

Figure 1:
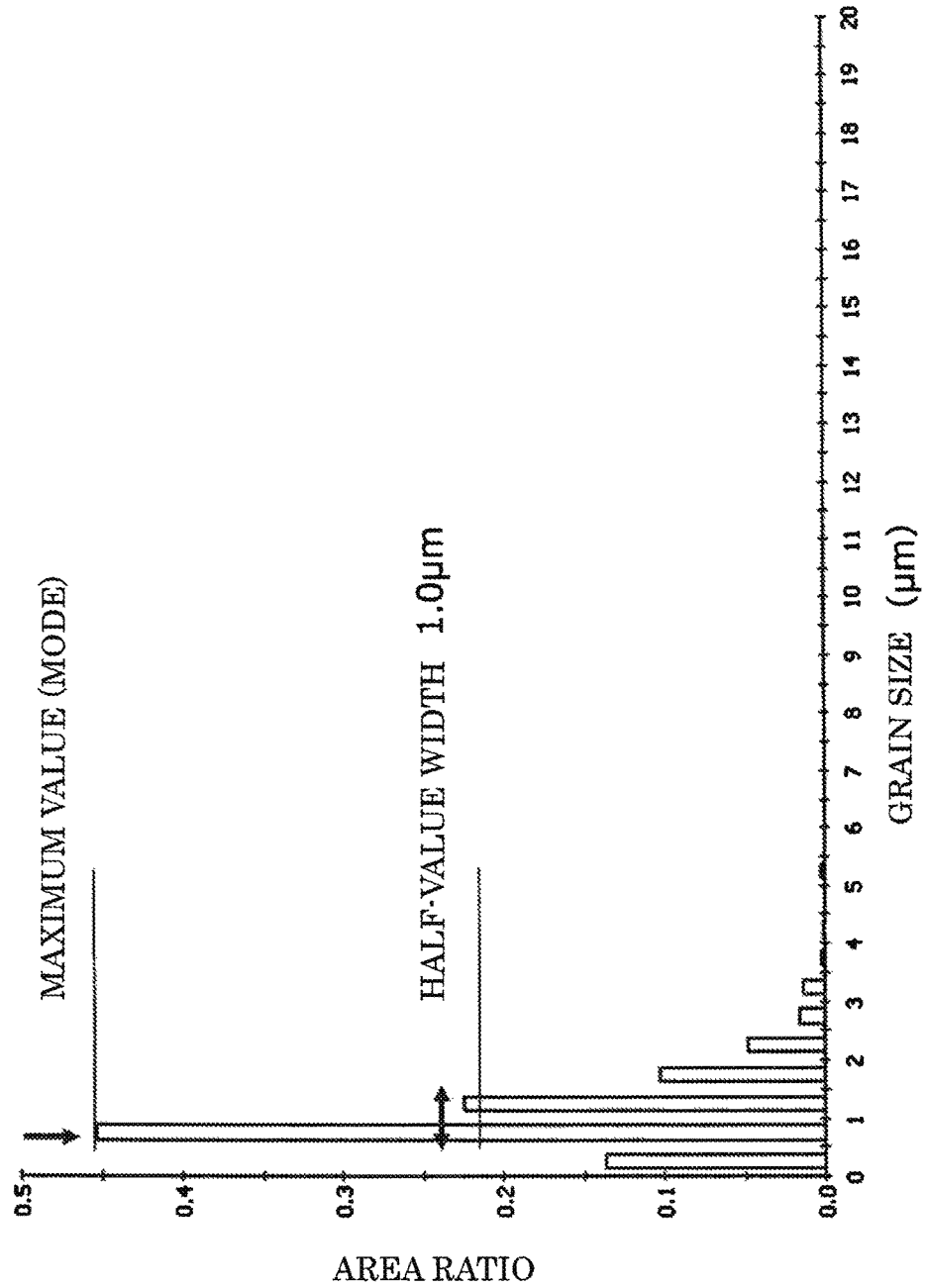
FIG. 1 is a grain size distribution of crystal grains of a thermal sprayed coating of Example 1.

A thermal sprayed coating for a sliding member of the present invention will be described in detail.

The thermal sprayed coating for a sliding member (hereinafter simply referred to as a "thermal sprayed coating") is composed of a corrosion resistant iron-based alloy containing iron (Fe) as a main component and containing 8 mass % or more of chromium (Cr). The thermal sprayed coating includes a structure in which crystal grains have an average grain diameter of 3 μm or less, and the thermal sprayed coating has Vickers hardness of 300 Hv or more. Note that the word "main component" in the present invention means a component that is contained in an amount of 50 mass % or more.

The thermal sprayed coating has Vickers hardness of 300 Hv or more and further includes a structure in which crystal grains are fined, thereby hardly causing plastic deformation due to sliding and being superior in wear resistance.

Specifically, each of the crystal grains in the thermal sprayed coating structure have respective different crystal orientations, and a relationship between a tensile direction in sliding and the crystal orientation differs in respective crystal grains. Thus, when slip occurs within a crystal grain by sliding, a gap is generated or overlapping occurs in the vicinity of a crystal grain boundary, whereby the slip does not extend beyond the crystal grain boundary and stops at the crystal grain boundary.

As described above, fined crystal grains in the thermal sprayed coating structure suppresses amount of dislocation slip and hardly causes plastic deformation when dislocation slip for plastic deformation occurs by sliding. As a result, the fined crystal grains increase strength and improve wear resistance by suppressing generation of abrasive particles.

The grain diameter of the crystal grain can be adjusted by controlling a cooling rate of thermal sprayed droplets and the composition of the iron-based alloy. Specifically, crystal grains are fined by performing thermal spraying on a base material having a high thermal conductivity, such as of aluminum or aluminum alloy, so as to rapidly cool thermal sprayed droplets. Moreover, an iron-based alloy having a composition by which martensite is easily generated, enables crystal grains to be fine.

In the thermal sprayed coating structure, a half-value width of a grain size distribution of crystal grains (an interval between two points at half of the maximum value of a grain diameter frequency) is preferably 2.5 µm or less, and more preferably 1.2 µm or less.

Crystal grains that have a sharp grain size distribution and that include a small amount of coarse crystal grains, suppress local occurrence of large plastic deformation in the thermal sprayed coating. Thus, the entire thermal sprayed coating is increased in strength, and wear resistance is improved.

The grain size distribution of crystal grains can be adjusted by controlling the composition of the iron-based alloy. An iron-based alloy that contains carbon and manganese can yield fine martensite while preventing a coarse austenitic structure from remaining, whereby a sharp grain size distribution of crystal grains is obtained.

The upper limit of hardness of the thermal sprayed coating is not specifically limited. However, if the thermal sprayed coating is too hard, when the thermal sprayed coating partially comes off from the surface to generate abrasive particles, the generated abrasive particles act as hard polishing agent and can reduce wear resistance.

The upper limit of hardness depends on, e.g., tendency to generate abrasive particles. However, it is preferably 600 Hv or less, more preferably 450 Hv or less, and further preferably 400 Hv or less.

The thermal sprayed coating preferably has an oxide ratio in cross section of 1% or less.

In general, a thermal sprayed coating is formed by melting a thermal spray wire at high temperatures, and therefore, the thermal sprayed coating that is formed by oxidizing thermal sprayed droplets tends to contain oxides in a large amount. However, the thermal sprayed coating of the present invention contains the oxide at a ratio of 1 area % or less, thereby having superior wear resistance.

The oxide has thermal conductivity smaller than those of metals, and the oxide has a high melting point and easily solidifies. Thus, oxide that are formed on a surface of a thermal sprayed droplet inhibits heat transmission from the thermal sprayed droplet to the base material, deformation of the thermal sprayed droplet, and metallic bonding between the thermal sprayed droplets, at the time of landing of the thermal sprayed droplet on the base material.

The small ratio of an oxide in the thermal sprayed coating means that, when a thermal sprayed droplet lands on the base material, a thermal sprayed droplet loses heat by the base material and is rapidly cooled to form a structure having fined crystal grains. Moreover, the thermal sprayed droplet is sufficiently deformed and densely deposits, whereby a bonded area of the thermal sprayed droplets is increased. Meanwhile, all the thermal sprayed droplets in the thermal sprayed coating are strongly bonded to each other by a metallic bond, without the metallic bond's being broken by the oxide, whereby coating strength is improved, and partial coming-off from the surface is prevented.

The ratio of the oxide in the thermal sprayed coating can be adjusted by a spraying atmosphere.

The oxide in the thermal sprayed coating does not originate from the composition of the thermal spray wire, but are generated mainly by oxidation of high-temperature thermal sprayed droplets, as described above.

Therefore, in order to prevent oxidation of thermal sprayed droplets that are flying, while non-oxidizing gas, such as nitrogen gas, is flowed as a shielding gas, thermal spraying is performed with the use of the non-oxidizing gas as a carrier gas. This suppresses generation of an oxide.

The ratio of the oxide in the thermal sprayed coating is measured from an optical microscopic image of a cross section of the thermal sprayed coating, as follows: identifying oxide based on difference in brilliance, binarizing the cross-sectional image for quantification, and measuring the area % of the cross-section.

Next, the composition of the iron-based alloy will be described.

The iron-based alloy contains 8 mass % or more of chromium and, as necessary, can contain other elements such as carbon (C), silicon (Si), manganese (Mn), nickel (Ni), and molybdenum (Mo).

Due to chromium (Cr) contained in the iron-based alloy, a passive film that is able to repair itself is formed, and improves corrosion resistance against acids originating from NOx or a sulfur component of fuel. The iron-based alloy preferably contains 10 mass % or more of chromium.

The upper limit of the content of chromium is not specifically limited. However, as the content of chromium increases, an austenitic structure increases while a martensitic structure is hardly formed, and grain diameters of crystal grains tend to be large. In view of this, the content of chromium is preferably 20 mass % or less, and more preferably 18 mass % or less.

The content of carbon is preferably 0.005 mass % or more and 0.2 mass % or less, and more preferably, 0.01 mass % or more and 0.1 mass % or less.

If the content of carbon is less than 0.005 mass %, hardness of the thermal sprayed coating tends to be reduced, and it may be difficult to obtain sufficient friction resistance. However, if the content of carbon exceeds 0.2 mass %, hardness of the thermal sprayed coating is increased, and wear characteristics against a mating member can be increased. In addition, in a case in which a coating of a mating member is a hard carbon film, which is described later, an affinity of the mating member with the coating is increased, and adhesion can occur to reduce friction resistance.

The content of silicon (Si) is preferably 0.1 mass % or more and 0.5 mass % or less. If the content of silicon is less than 0.1 mass %, tensile strength of the thermal sprayed coating is lowered. On the other hand, if the content of silicon exceeds 0.5 mass %, wear resistance can be reduced.

The reasons for this are still not revealed, but the following may be one of the reasons. Silicon is hardly solid-solved in an iron-based alloy and is unevenly distributed on a surface of a thermal sprayed droplet. Due to this, microscopic fracture occurs at a grain boundary, starting from a single body silicon, silicon nitride, silicon oxide and the like, which are brittle and have low strength compared with an iron-based thermal sprayed coating, whereby a crack and coming-off easily occur from an interface of the thermal sprayed droplet.

The content of manganese (Mn) is preferably 0.3 mass % or more and 4 mass % or less. Manganese is uniformly solid-solved in the entire thermal sprayed coating and facilitates formation of a martensitic structure in the thermal sprayed coating structure to fine crystal grains. Thus, a coarse austenitic structure hardly remains, and a grain size distribution of the crystal grains becomes sharp.

The film thickness of the thermal sprayed coating is preferably 100 μm or more and 400 μm or less.
If the film thickness of the thermal sprayed coating is less than 100 μm, it is difficult to form recesses and projections having heights sufficient to enhance peeling resistance, and if the film thickness exceeds 400 μm, heat accumulates when thermal spraying is performed, whereby coating strength is lowered, and wear resistance may be reduced.

The iron-based alloy for composing the thermal sprayed coating has a thermal conductivity lower than that of an aluminum or aluminum alloy base material, which will be described later, and thus, a cooling efficiency decreases as the film thickness of the thermal sprayed coating increases.

In the present invention, it is possible to provide recesses and projections on an inner circumferential surface of a cylinder bore to improve peeling resistance of the thermal sprayed coating. In the case of providing recesses and projections, the film thickness of the thermal sprayed coating represents a thickness from a bottom of the recesses and projections.

<Sliding Device>
The sliding device of the present invention includes a sliding member and a mating member that mutually slide.
The mating member has a hard carbon film on a base material, and the sliding member includes the thermal sprayed coating for a sliding member, on a base material.

The mating member, which slides with the sliding member having the thermal sprayed coating, has the hard carbon film as a sliding surface, whereby seizure resistance is improved. In general, it is known that a combination of the same types of materials reduces seizure resistance. The reason for this is that the combination of the same types of materials tends to occur adhesion due to their high mutual affinity and easily generates abrasive particles.

On the other hand, seizure resistance of a combination of different types of materials is influenced not only by mutual affinity of the different types of the materials, but also by a lot of factors, such as material factors, e. g., mechanical and chemical characteristics of materials, and dynamic factors. For this reason, it is very difficult to predict seizure resistance of the combination of different types of materials.

The sliding mating material has the hard carbon film (DLC), and therefore, the thermal sprayed coating for a sliding member hardly occurs adhesion and exhibits greatly improved wear resistance, compared with a case in which a sliding mating material is other coating that is generally used for a piston ring, such as a chromium (Cr) coating or a chromium nitride (CrN) coating.

The surface roughness (Ra) of the hard carbon film is preferably 0.1 μm or less. The hard carbon film has high hardness, and therefore, if the surface roughness (Ra) exceeds 0.1 μm, wear characteristics against a mating member increase, whereby wear resistance can be easily reduced.

The sliding device of the present invention can be suitably used for a piston and a cylinder block that are used in an internal combustion engine. For example, in the sliding device, a piston has the hard carbon film on a sliding surface, e.g. a piston ring, with a mating member, and a sliding member, such as a cylinder block, has the thermal sprayed coating on an inner surface of a bore that slides with the piston. With this configuration, superior friction resistance is obtained.

Aluminum or aluminum alloy can be suitably used for the base material of each of the cylinder block and the piston, and these materials reduce weight of an internal combustion engine.

EXAMPLES

The present invention will be explained in detail with reference to Examples hereinafter, but the present invention is not limited to Examples described below.

An inner circumferential surface of a cylinder bore of an ADC12 alloy gasoline-engine cylinder block was grooved to have recesses and projections with heights of approximately 85 μm.

A thermal sprayed coating having a film thickness of 270 μm from the bottom of the recesses and projections was formed by arc spraying method with the use of a thermal spray wire having a composition shown in Table 1.

Thermal spraying was performed as follows. After the cylinder block was preheated to 120° C., a nozzle was inserted into the cylinder bore at room temperature. Then, spraying of thermally spraying droplets was performed at 1200 L/min in the air atmosphere by using nitrogen gas for splashing thermally spraying droplets, while nitrogen gas was flowed at 500 L/min as a shielding gas.

The formed thermal sprayed coating was ground in such a manner that a flat part, excluding a pit specific to the thermal sprayed coating, was finished to have a surface roughness (Ra) of 0.05 μm or less.

<Evaluation>
The coating was evaluated by the following methods. The results of evaluation are shown in Table 1 together with the composition of the thermal sprayed coating.

(Composition of Thermal Sprayed Coating)
The composition of the thermal sprayed coating was quantitatively measured by dissolving a piece of the thermal sprayed coating obtained by scraping the cylinder block in nitric acid, followed by conducting an inductively coupled plasma analysis (IPC analysis).
In addition, the thermal spray wire was also subjected to IPC analysis in a similar manner, and it was confirmed that the thermal sprayed coating and the thermal spray wire had the same composition.
In the IPC analysis, the amounts of oxygen and nitrogen were detection limits or less.

(Vickers Hardness)
Vickers hardness was measured on a selected part where pores in the thermal sprayed coating did not affect, at a load of 50 g, in accordance with "Vickers hardness test (JIS Z 2244)".

Figure 2:
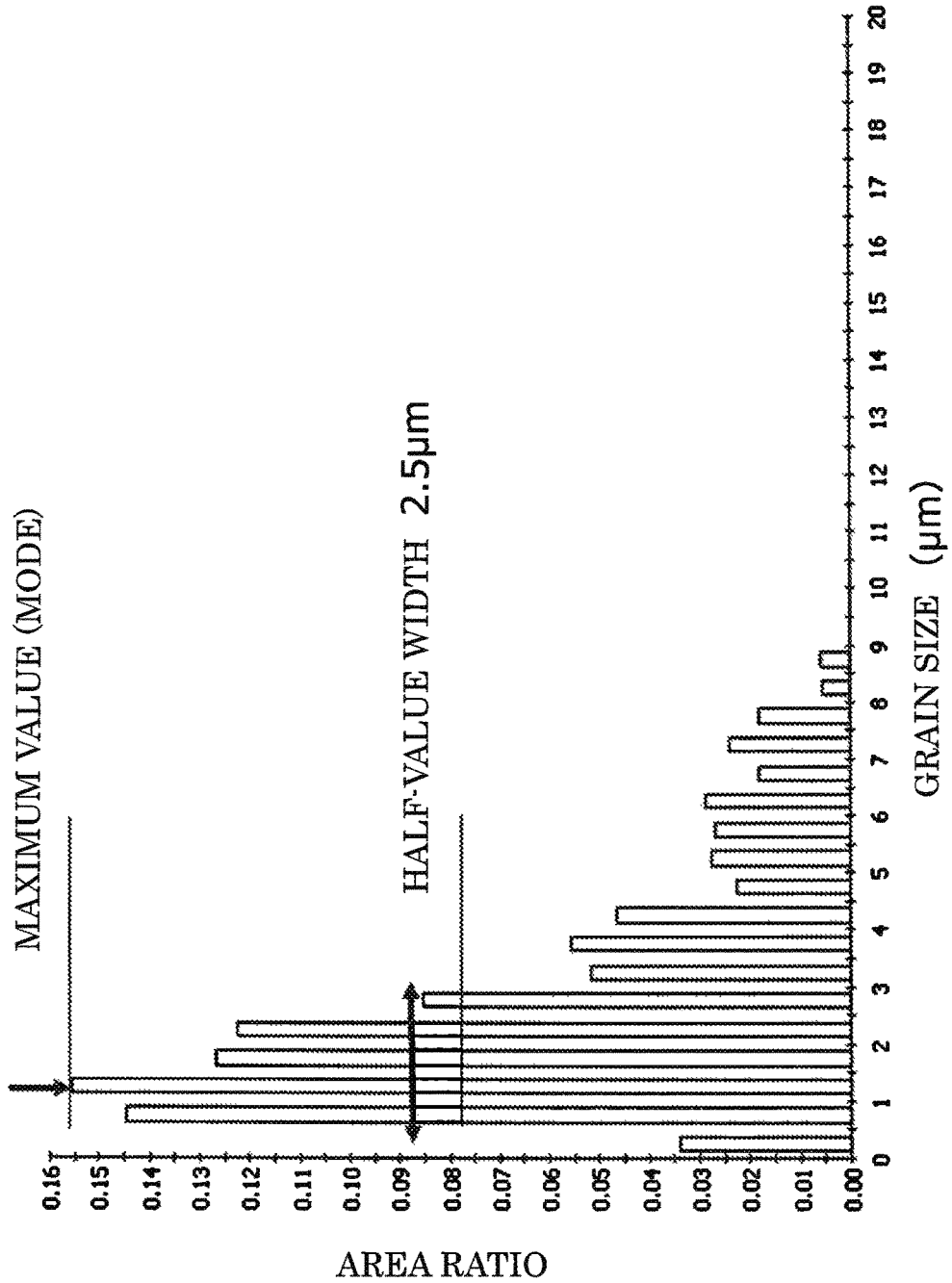
FIG. 2 is a grain size distribution of crystal grains of a thermal sprayed coating of Example 3.
Figure 3:
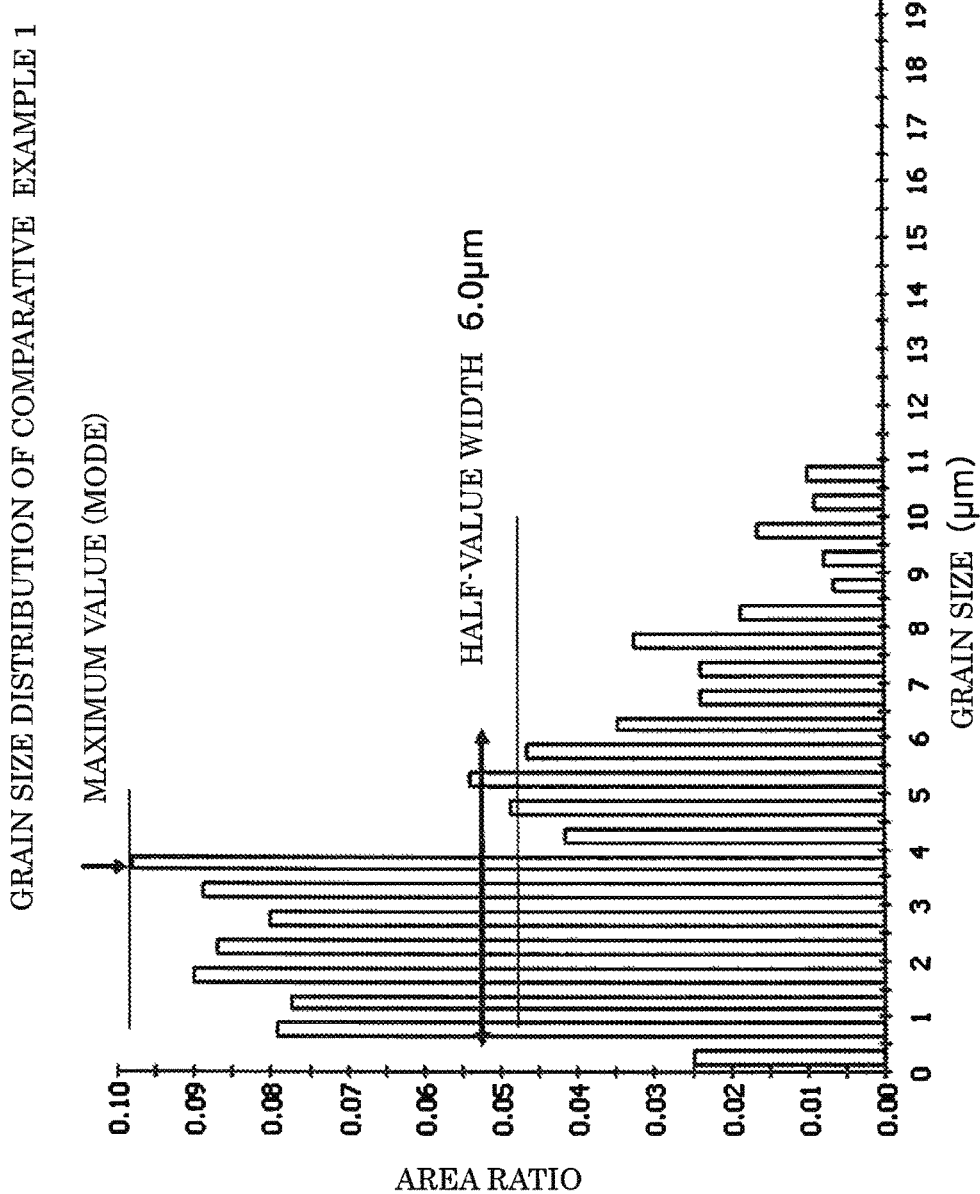
FIG. 3 is a grain size distribution of crystal grains of a thermal sprayed coating of Comparative Example 1.
Figure 4:
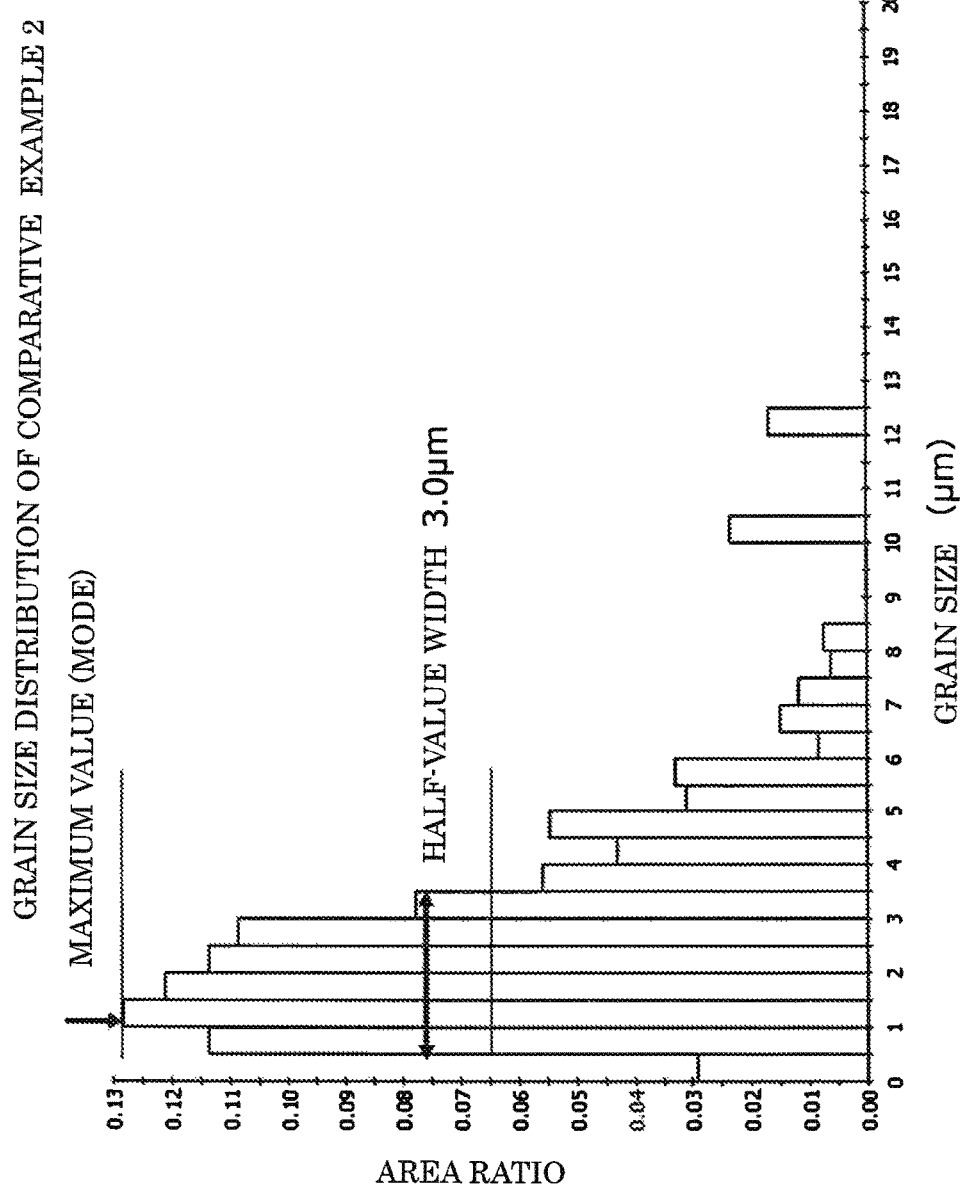
FIG. 4 is a grain size distribution of crystal grains of a thermal sprayed coating of Comparative Example 2.

(Measurement of Grain Size Distribution of Crystal Grains)
A cross section of the thermal sprayed coating was subjected to plane analysis using electron probe microanalyzer (EPMA). Then, a grain diameter was calculated based on an area of a crystal grain by taking a discontinuous surface having deviation of crystal orientation of 5 degrees or more as a grain boundary. A grain size distribution (histogram) based on an area ratio was then generated, and an average grain diameter and a half-value width of crystal grains were obtained. Grain size distributions of Examples 1 and 3 and Comparative Examples 1 and 2 are shown in FIGS. 1 to 4, respectively.

(Measurement of Ratio of Oxides)

A cross section of the thermal sprayed coating was subjected to plane analysis using electron probe microanalyzer (EPMA), whereby oxides were identified.

Next, a ratio (area %) of oxides was calculated by using an optical microscope, in which a cross section of the thermal sprayed coating was magnified by 20 times. On the basis of difference in brilliance of oxides that were identified by using the electron microprobe analyzer, a ratio (area %) of oxides in an image was calculated by binarizing a cross-sectional image of an optical microscopic image.

Oxides ratios of Examples 1 to 4 and Comparative Examples 1 and 2 were from 0.03 to 0.5 area %.

(Wear Resistance)

The thermal sprayed coating was cut out in a size of 15 mm×20 mm, together with the base material. The cut piece was slid with a test piece that was cut out from a piston ring, the surface of which had a hard carbon film having a surface roughness (Ra) of 0.1 μm or less. After sliding was performed for 60 minutes, a depth of wear of the thermal sprayed coating was measured.

In the test, reciprocation was performed at 25 Hz and at a stroke of 3 mm under a fixed load of 300 N, while poly-alpha-olefin (PAO) having kinematic viscosity of 4 cst at 100° C. was used as lubricating oil.

TABLE 1

|  |  | Example 1 | Example 2 | Example 3 | Example 4 | Comparative Example 1 | Comparative Example |
|---|---|---|---|---|---|---|---|
| Chemical | C | 0.11 | 0.1 | 0.01 | 0.01 | 0.11 | 0.1 |
| Composition | Si | 0.325 | 0.41 | 0.44 | 0.33 | 0.41 | 0.48 |
|  | Mn | 1.7 | 0.3 | 0.3 | 3.18 | 2.3 | 8.67 |
|  | Ni | — | — | — | — | 13.56 | 12.04 |
|  | Cr | 12.5 | 11.58 | 17 | 10 | 23.4 | 18.12 |
|  | Mo | — | — | — | — | 2.17 | 0.83 |
|  | Fe | Balance | Balance | Balance | Balance | Balance | Balance |
| Depth of Wear (μm) |  | 0.28 | 0.6 | 0.61 | 0.25 | 1.9 | 1.7 |
| Average Grain Diameter of Crystal Grains (μm) |  | 1.13 | 1.99 | 2.65 | 1.6 | 3.96 | 3.07 |
| Half-Value Width |  | 1 | 1 | 2.5 | 1 | 6 | 3 |
| Hardness (Hv) |  | 388 | 505 | 437 | 430 | 279 | 260 |

Table 1 reveals that the thermal sprayed coatings of Examples 1 to 4 which satisfy an average grain diameter of crystal grains of 3 μm or less and Vickers hardness of 300 Hv or more had a small depth of wear and exhibited superior wear resistance. The thermal sprayed coating of Example 2 was harder than that of Example 1, but had an average grain diameter of crystal grains larger than that of Example 1. As a result, the thermal sprayed coating of Example 2 had a depth of wear greater than that of the thermal sprayed coating of Example 1.

The invention claimed is:

1. A thermal sprayed coating for a sliding member, the thermal sprayed coating comprising:
   an iron-based alloy containing chromium (Cr), wherein:
   a content of chromium in the thermal sprayed coating is 8 mass % or more,
   the thermal sprayed coating includes a structure in which an average grain diameter of crystal grains is 3 μm or less, and
   a Vickers hardness of the thermal sprayed coating is 300 Hv or more.

2. The thermal sprayed coating for a sliding member according to claim 1, wherein a half-value width of a grain size distribution of the crystal grains is 2.5 μm or less.

3. The thermal sprayed coating for a sliding member according to claim 2, wherein a ratio of an oxide in cross section of the thermal sprayed coating is 1 area % or less.

4. The thermal sprayed coating for a sliding member according to claim 2, wherein a content of carbon is 0.005 mass % or more and 0.2 mass % or less.

5. A sliding device comprising:
   a sliding member; and
   a mating member; wherein:
   the sliding member and the mating member are configured to slide against each other,
   the sliding member and the mating member each have a coating on a base material,
   the coating of the mating member is a hard carbon film, and
   the coating of the sliding member is the thermal sprayed coating according to claim 2.

6. The sliding device according to claim 5, wherein the hard carbon film has a surface roughness (Ra) of 0.1 μm or less.

7. The sliding device according to claim 5, wherein the base material of the sliding member and/or the mating member is aluminum or aluminum alloy.

8. The sliding device according to claim 5, wherein the sliding member is a piston, and the mating member is a cylinder block.

9. The thermal sprayed coating for a sliding member according to claim 1, wherein a ratio of an oxide in cross section of the thermal sprayed coating is 1 area % or less.

10. The thermal sprayed coating for a sliding member according to claim 1, wherein a content of carbon is 0.005 mass % or more and 0.2 mass % or less.

11. A sliding device comprising:
    a sliding member; and
    a mating member; wherein:
    the sliding member and the mating member are configured to slide against each other,
    the sliding member and the mating member each have a coating on a base material,
    the coating of the mating member is a hard carbon film, and
    the coating of the sliding member is the thermal sprayed coating according to claim 1.

12. The sliding device according to claim 11, wherein the hard carbon film has a surface roughness (Ra) of 0.1 μm or less.

13. The sliding device according to claim 11, wherein the base material of the sliding member and/or the mating member is aluminum or aluminum alloy.

14. The sliding device according to claim 11, wherein the sliding member is a piston, and the mating member is a cylinder block.

\* \* \* \* \*